United States Patent
Hohmann et al.

(10) Patent No.: US 7,316,534 B2
(45) Date of Patent: Jan. 8, 2008

(54) INTEGRATED PIN AND CLIP

(75) Inventors: Rolf Hohmann, Menomonee Falls, WI (US); Chris Irgens, Elm Grove, WI (US); Gary Burmesch, Port Washington, WI (US); Kerry Jacques, Wind Lake, WI (US); Mark Van Handel, Milwaukee, WI (US); Michael Sheridan, Lake Villa, IL (US)

(73) Assignee: Master Lock Company LLC, Oak Creek, WI (US)

( * ) Notice: Subject to any disclaimer, the term of this patent is extended or adjusted under 35 U.S.C. 154(b) by 35 days.

(21) Appl. No.: 10/710,253

(22) Filed: Jun. 29, 2004

(65) Prior Publication Data

US 2004/0265049 A1 Dec. 30, 2004

Related U.S. Application Data

(60) Provisional application No. 60/481,045, filed on Jun. 30, 2003.

(51) Int. Cl.
*F16B 21/00* (2006.01)
*B60D 1/02* (2006.01)

(52) U.S. Cl. .................. 411/340; 280/515; 24/609; 70/34

(58) Field of Classification Search ............... 411/340, 411/41, 34, 482; 280/515; 24/609; 70/32–34
See application file for complete search history.

(56) References Cited

U.S. PATENT DOCUMENTS

| | | | |
|---|---|---|---|
| 325,221 A | 8/1885 | Wright | |
| 370,028 A * | 9/1887 | Votaw | 24/609 |
| 2,224,522 A * | 12/1940 | Peterson | 411/340 |
| 2,997,909 A | 8/1961 | Ames | |
| 3,279,302 A * | 10/1966 | Modrey | 411/350 |
| 3,673,910 A * | 7/1972 | Collister | 411/345 |
| 3,861,267 A | 1/1975 | Collister | |
| 4,087,112 A * | 5/1978 | Lee, Jr. | 280/515 |
| 4,207,794 A | 6/1980 | Collister | |
| 5,437,515 A | 8/1995 | Kuramoto et al. | |
| 5,507,611 A * | 4/1996 | Collister | 411/345 |
| 5,865,559 A * | 2/1999 | Yang | 403/322.1 |
| 6,145,866 A | 11/2000 | Peter | |
| 6,193,260 B1 * | 2/2001 | Homan et al. | 280/515 |
| 6,409,203 B1 | 6/2002 | Williams | |
| 2001/0054807 A1 | 12/2001 | Homan et al. | |

FOREIGN PATENT DOCUMENTS

| | | |
|---|---|---|
| DE | 849657 | 7/1949 |
| DE | 938288 | 1/1956 |
| DE | 91256 | 7/1961 |
| GB | 1011329 | 11/1965 |

* cited by examiner

*Primary Examiner*—Katherine Mitchell
(74) *Attorney, Agent, or Firm*—Calfee, Halter & Griswold LLP (57) ABSTRACT

An integrated pin and clip for securing vehicle trailer components. The integrated pin and clip includes a shaft member and a clip member. The clip member is movable between a locked and an unlocked position. The unlocked position allows for the integrated pin and clip to be inserted and withdrawn from a receiving aperture in a vehicle trailer component, such as a receiver. The locked position does not allow the integrated pin and clip to be inserted and withdrawn from the aperture. The integrated pin and clip also includes retention means that secures the clip in either the locked position or the unlocked position.

11 Claims, 6 Drawing Sheets

INTEGRATED PIN AND CLIP

CROSS REFERENCE To RELATED APPLICATIONS

This application claims the benefit of U.S. Provisional Application No. 60/481,045 filed Jun. 30, 2003, the entire disclosure of which is hereby incorporated by reference.

BACKGROUND OF INVENTION

Many vehicles today are equipped to provide for towing trailers, campers, boats, or the like. Most vehicles are equipped with a receiver-type trailer hitch, wherein the trailer attaches to a hitch ball secured to a ball mount located on the back of the vehicle. Most vehicles do not have an integral hitch ball, but instead have a means for receiving a hitch ball onto the ball mount. Typically, these vehicles have a receiver or a tube that receives a draw-bar that has an integral or attachable hitch ball. The vehicle trailer receiver and draw bar have corresponding holes that align when the draw bar is fully attached. Once these holes are aligned, a coupler pin can be placed through the corresponding holes, thereby securing the draw bar to the vehicle. The coupler pin may include a clip that can be moved such as to prevent withdrawal of the coupler pin. The non-inserted end of the coupler pin is designed to prevent further insertion of the coupler pin into the corresponding holes. This can be achieved by enlarging the non-inserted end, placing a larger portion on the non-inserted end, or bending the non-inserted end such that it cannot be inserted into the corresponding holes.

In the past, coupler pins have provided for a locking, or securing, means that prevents movement back to the position wherein the coupler pin can be removed. However, such coupler pins do not provide any other locking, or securing, means. As a consequence the installer must align the coupler clip with the holes and make sure that it does not move while the coupler pin is inserted into the trailer receiver. As such, there exists a need for an improved coupler pin that provides for easy application and removal of the coupler pin and can be secured in position once inserted into the trailer.

SUMMARY OF INVENTION

The present invention relates to an integrated pin and clip for securing a ball mount to a receiver. The integrated pin and clip includes a locking member that can secured in two different positions, a locked position and an unlocked position. The locking member is in the unlocked position when generally coaxial to the shaft of the integrated pin and clip and in the locked position when generally perpendicular to the shaft of the integrated pin and clip. The locking member is secured in each of those positions by a retention means, which requires force or movement in order to allow the clip to move to and from the locked and unlocked positions.

BRIEF DESCRIPTION OF DRAWINGS

The present invention may be more readily understood by reference to the following drawings. While certain embodiments are shown as illustrative examples of the invention, the scope of this application should not be construed as limited to these illustrative examples.

DETAILED DESCRIPTION

Figure 15:
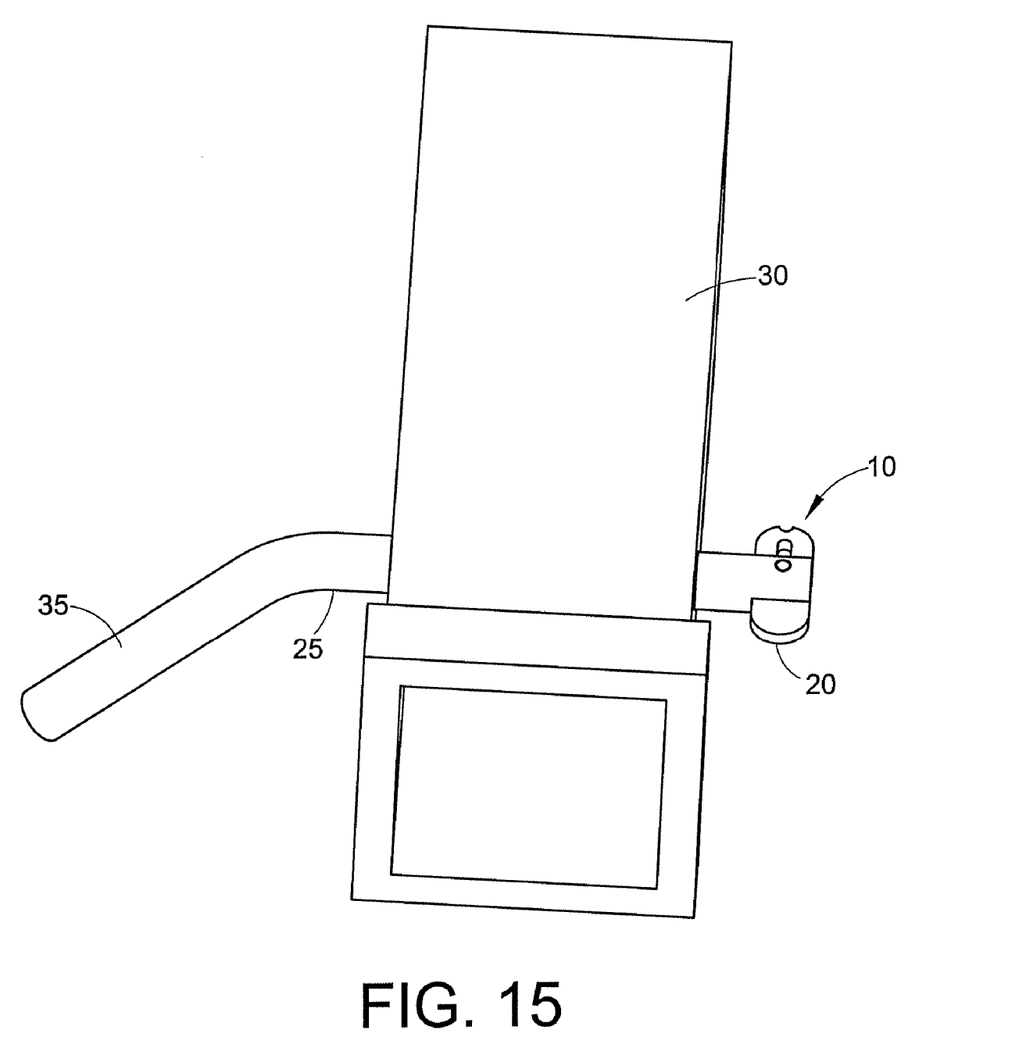
FIG. 15 illustrates an integrated pin and clip in a locked position and inserted through a receiver.

The present invention is an integrated pin and clip, generally referred to as 10. The integrated pin and clip 10 includes locking means, generally referred to as 20, and a shaft member 25. The locking means 20 is designed to have two distinct positions, a locked position and an unlocked position. When the locking means 20 is in the unlocked position, such as shown in FIGS. 1, 3, 5, 7, 9, 11, and 13, the locking means is generally parallel to the shaft member 25 and allows insertion of the integrated pin and clip 10 into a hole in a receiver 30. When the locking means 20 is in the locked position, such as shown in FIGS. 2, 4, 6, 8, 10, and 12, the locking means is generally perpendicular to the shaft member 25 and does not allow the integrated pin and clip 10 to be removed from the receiver 30. FIG. 15 illustrated an embodiment of the integrated pin and clip 10 in the locked position on a receiver.

Each of the locked and unlocked positions include a retaining means that maintain the locking means 20 in the respective locked and unlocked, or neutral, positions. The retaining means can include a number of mechanisms and is best described in the illustrative embodiments below. These embodiments are not meant to be limiting, but merely examples of illustrating the inventive concept described herein. Generally, the retaining means requires some additional force or movement of the locking means in order to move the locking means from the locked or unlocked position. As such, the pin will remain so positioned until the user provides for such force or movement, thereby avoiding accidental movement and allowing easy application of the integrated pin and clip.

Figure 1:
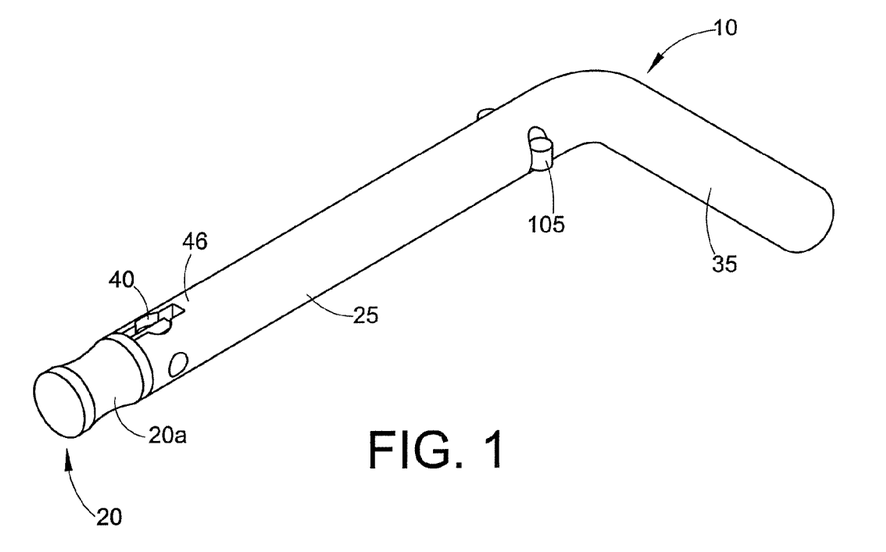
FIG. 1 is a perspective view of a first embodiment of an integrated pin and clip shown in the unlocked position.
Figure 2:
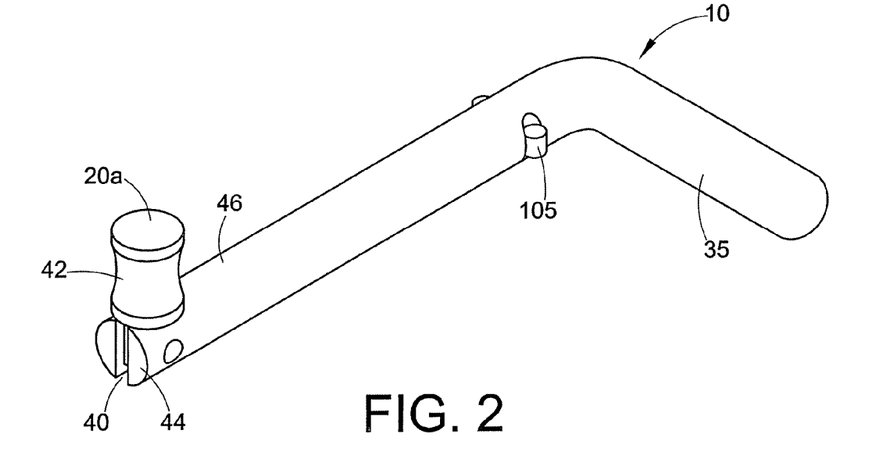
FIG. 2 is a view of the integrated pin and clip of FIG. 1 shown in the locked position.

The details of the present invention will now be described with reference to a number of illustrative embodiments. It should be appreciated by those skilled in the art that the present invention should not be limited to any of the particular embodiments disclosed herein, as modifications and combinations of the disclosed embodiments are contemplated by this application.

FIGS. 1-2 illustrate the first embodiment of the integrated pin and clip 10. The integrated pin and clip 10 is an angled piece of bar stock forming a shaft member 25 and a angled member 35, with a cutout portion 40 at the opposite end as the angled member. The cutout portion 40 generally includes three cut outs, located 90 degrees apart, in the general shape to receive the locking member 20. In this embodiment, the locking member is a clip 20a that is a cylindrical piece that can include indented regions 42 towards the middle of the clip to assist in gripping. The clip is spring-loaded to securely hold the clip against the shaft member 25. To operate the integrated pin and clip 10, the user pulls the spring-loaded locking clip into coaxial alignment with the shaft 25 and allows the locking clip to lock into engagement with the cut-out portion 40 located on the end 44 of the shaft 25. This position is shown in FIG. 1. The user can then insert the integrated pin and clip 10 into the vehicle receiver, coupler or other device and the clip 20a will maintain coaxial alignment with the shaft member 25. The integrated pin and clip 10 is inserted through the receiver until the clip 20a is received through the opposite side of the receiver, as shown in FIG. 15. The clip 20a can then be moved to a locking position, shown in FIG. 2, by pulling the clip 20a from engagement with the cut-out portion 40 and rotating it 90 degrees in either direction. The clip 25 can then be released and the spring seats the clip in one of the locking cut-out portions along the sides 46 of the shaft member 25. The angled end 35 of the integrated pin and clip 10 prevents further insertion. To remove the integrated pin and clip 10, the clip 20a is moved into coaxial alignment with the shaft member 25, thereby allowing the integrated pin and clip 10 to be removed from the receiver.

Figures 3, 4, 5, 6:
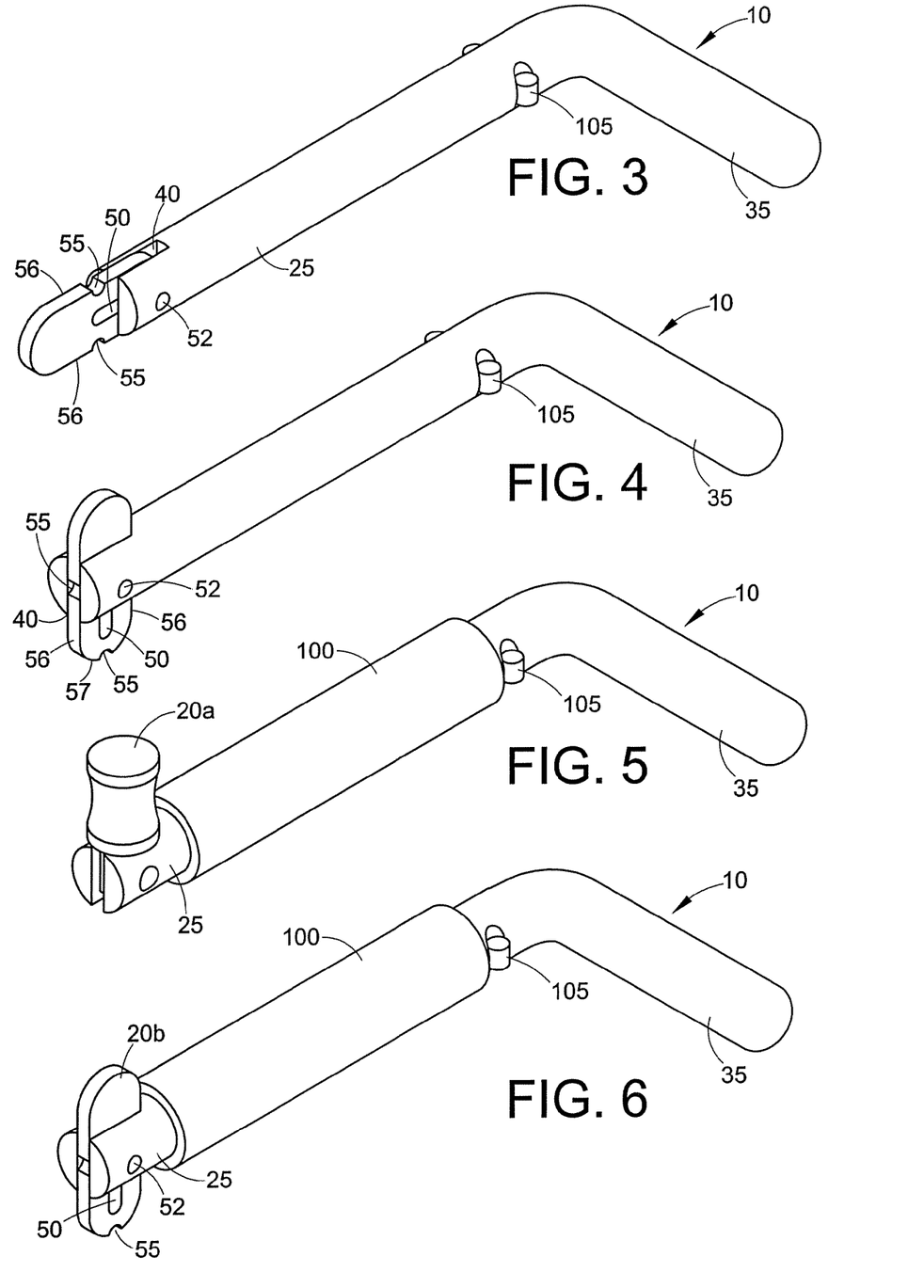
FIG. 3 is a perspective view of a second embodiment of an integrated pin and clip shown in the unlocked position.
FIG. 4 is a perspective view of the integrated pin and clip of FIG. 3 shown in the locked position.
FIG. 5 is a view of the integrated pin and clip of FIG. 1 shown with a sleeve adapter.
FIG. 6 is a view of the integrated pin and clip of FIG. 3 shown with a sleeve adapter.

FIGS. 3 and 4 illustrate a second embodiment of the integrated pin and clip 10. The integrated pin and clip 10 is an angled piece of bar stock forming a shaft member 25 and a angled member 35, with a cutout portion 40 at the opposite end as the angled member. The cutout portion 40 generally includes three cut outs, located 90 degrees apart, in the general shape to receive the locking member 20. In this embodiment, the locking member is a blade 20b. The locking blade 20b is generally a flat with rounded ends, and includes a slot 50 through which a pivot pin 52 is received. The locking blade 20b includes notches 55 on either side 56, as well as on the back side 57, for receiving spring-loaded ball bearings, or pins (not shown). To operate, the locking blade 20b is pulled outward away from the shaft member 25 to disengage the ball bearing from the back side notch 55. The locking blade 20b is then rotated ninety degrees in either direction and slid radially until one of the side notches 55 engage the spring-loaded ball bearing. So positioned, the receiver is locked as the integrated pin and clip 10 cannot be further advanced nor removed from the receiver. To remove the integrated pin and clip 10, the locking blade 20b is slid radially and rotated to the unlocked position, where the locking blade 20b is generally coaxial to the shaft member 25. Once in the unlocked position, the spring-loaded ball bearing engages the notch 55 in the back side 57 of the locking blade 20b, thereby securing the locking blade 20b in the neutral or coaxial position. So positioned, the integrated pin and clip 10 can be removed from the receiver and the clip will not rotate.

One variation on the integrated pin and clip 10 shown in FIGS. 2 and 3 is to replace the indents 55 and slot 50 with a t-shaped slot (not shown). When the locking blade 20b is moved to the locked position, the ball bearing will push the locking blade 20b outward thereby sliding the pivot pin 52 into one of the "t"-extensions and securing the clip in the locked position.

Figures 7, 8, 9, 10:
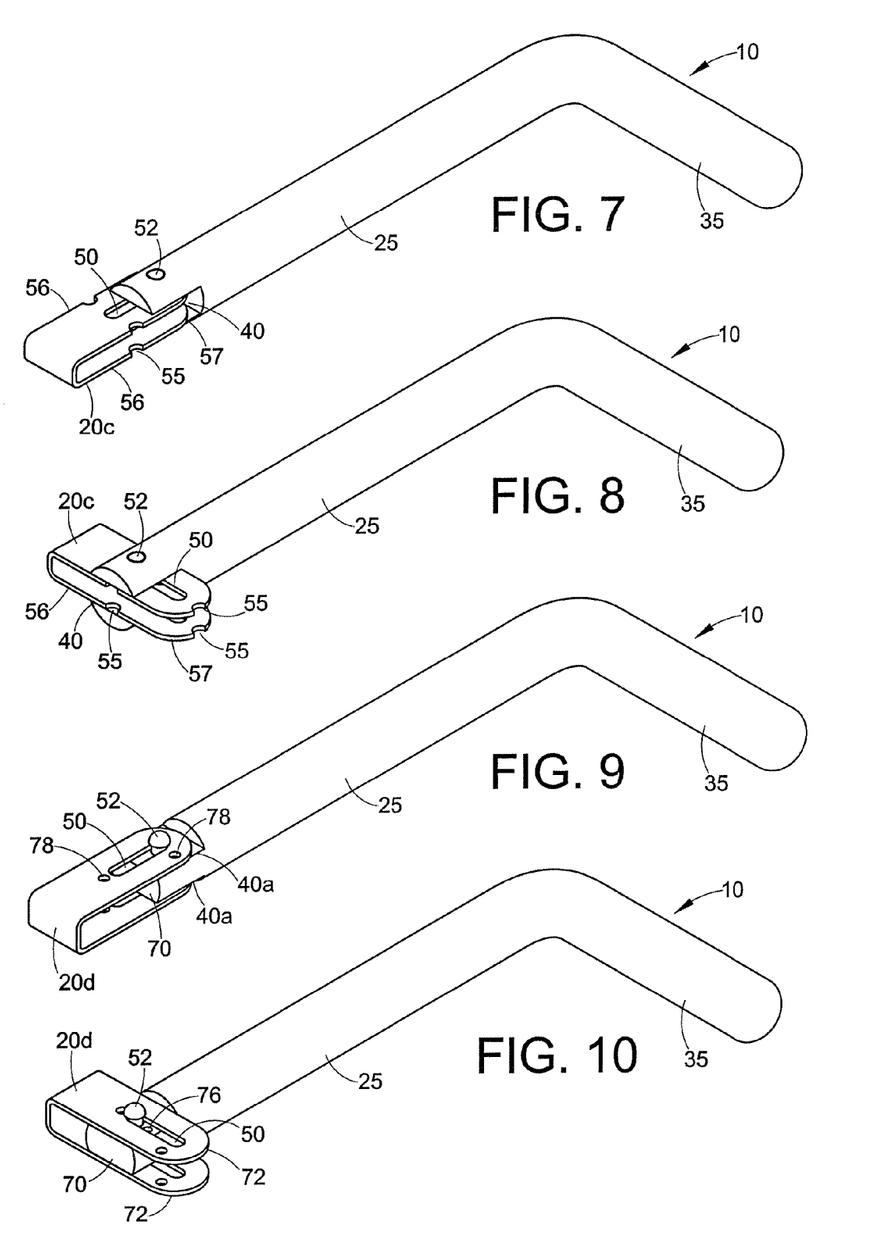
FIG. 7 is a perspective view of a third embodiment of an integrated pin and clip shown in the unlocked position.
FIG. 8 is a view of the integrated pin and clip of FIG. 7 shown in the locked position.
FIG. 9 is a perspective view of a fourth embodiment of an integrated pin and clip shown in the unlocked position.
FIG. 10 is a view of the integrated pin and clip of FIG. 9 shown in the locked position.

FIGS. 9-10 illustrate a fourth embodiment of the integrated pin and clip 10. The integrated pin and clip 10 is an angled piece of bar stock forming a shaft member 25 and a angled member 35, with a cutout portion 40a at the opposite end as the angled member. The cutout portion 40a generally includes a portion taken from the shaft member 25 on opposite sides. In this embodiment, the locking member is u-shaped clip 20d fastened about the central stem 70 of the integrated pin and clip end. The clip 20d is generally u-shaped and connected to the integrated pin and clip 10 via a pivot pin 52 which is inserted through a slot 50 located on each of the u-shaped arms 72 of the clip 20d. On the cut out portions 40a of the integrated pin and clip 10 are generally flat with four (two on each flat portion) generally spherical detent-receiving cutouts 76. The clip 20d has two detents 78 located on either arm 72, positioned such that the detents engage one set of the detent-receiving cutouts 76 when the clip 20d is in the neutral or unlocked position and a second set of detent-receiving cutouts 76 when the clip 20d is in the locked position. As such, to operate the integrated pin and clip 10, the clip 20d is forced to disengage the first set of detents 78 from the first set of detent-receiving cutouts 78, thereby allowing the clip 20d to rotate ninety degrees in either direction. Once rotated ninety degrees, the clip 20d is slid radially until the second set of detents 76 is secured in the second set of detent-receiving cutouts 78. So positioned, the receiver is locked as the integrated pin and clip 10 cannot be further inserted or removed from the receiver. To remove the integrated pin and clip 10 from the receiver, the clip 20d is forced such that the second detents 76 disengage from the second set of detent-receiving cut-outs 78 and the clip 20d is slid radially and then rotated to the unlocked or neutral position. Once in the neutral position, the first set of detents 76 engage the first set of detent receiving cutouts 78, thereby securing the clip 20d coaxial to the pin. The integrated pin and clip 10 can thus be removed from the receiver and the clip 20d will not rotate.

FIGS. 9-10 illustrate a third embodiment of the integrated pin and clip 10. The integrated pin and clip 10 is an angled piece of bar stock forming a shaft member 25 and a angled member 35, with a cutout portion 40 a at the opposite end as the angled member. The cutout portion 40a generally includes a portion taken from the shaft member 25 on opposite sides. In this embodiment, the locking member is u-shaped clip 20d fastened about the central stem 70 of the integrated pin and clip end. The clip 20d is generally u-shaped and connected to the integrated pin and clip 10 via a pivot pin 52 which is inserted through a slot 50 located on each of the u-shaped arms 72 of the clip 20d. On the cut out portions 40a of the integrated pin and clip 10 are generally flat with four (two on each flat portion) generally spherical detent-receiving cutouts 76. The clip 20d has two detents 78 located on either arm 72, positioned such that the detents engage one set of the detent-receiving cutouts 76 when the clip 20d is in the neutral or unlocked position and a second set of detent-receiving cutouts 76 when the clip 20d is in the locked position. As such, to operate the integrated pin and clip 10, the clip 20d is forced to disengage the first set of detents 78 from the first set of detent-receiving cutouts 78, thereby allowing the clip 20d to rotate ninety degrees in either direction. Once rotated ninety degrees, the clip 20d is slid radially until the second set of detents 76 is secured in the second set of detent-receiving cutouts 78. So positioned, the receiver is locked as the integrated pin and clip 10 cannot be further inserted or removed from the receiver. To remove the integrated pin and clip 10 from the receiver, the clip 20d is forced such that the second detents 76 disengage from the second set of detent-receiving cut-outs 78 and the clip 20d is slid radially and then rotated to the unlocked or neutral position. Once in the neutral position, the first set of detents 76 engage the first set of detent receiving cutouts 78, thereby securing the clip 20d coaxial to the pin. The integrated pin and clip 10 can thus be removed from the receiver and the clip 20d will not rotate.

A modification to this embodiment would be to switch the locations of the detents 76 with the detent-receiving cutouts 78. The integrated pin and clip 1o would operate in the same manner.

Figures 11, 12:
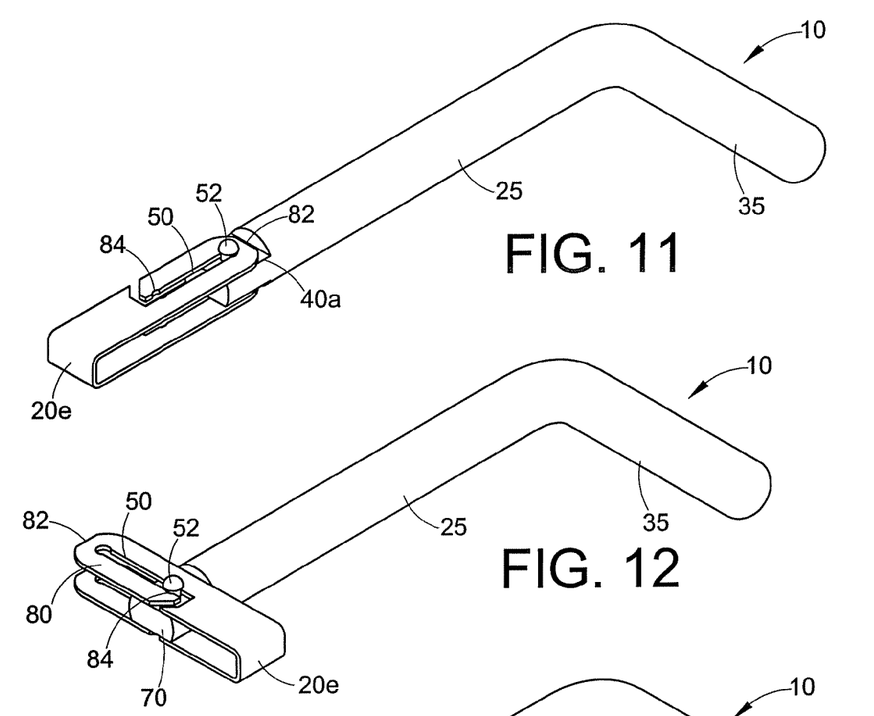
FIG. 11 is a perspective view of a fifth embodiment of an integrated pin and clip shown in the unlocked position.
FIG. 12 is a view of the integrated pin and clip of FIG. 11 shown in the locked position.

Another modification of this embodiment is shown in FIGS. 11-12. The clip 20e is generally u-shaped with a slot 50 formed by a tension arm 80. The clip slot 50 engages a pivot pin 50. The back side of the clip 20e includes a generally flattened portion 82 which provides resistance to the rotation of the clip 20e. To operate, the clip 20e is rotated ninety degrees and slid radially. As the clip 20e is slid, the pivot pin 52 applies pressure to the tension arm 80 until the pivot pin 50 is engaged by a set of notches 84 in the tension arm 80. The notches 84 allow the tension arm 80 to snap back into place, thereby secure the pivot pin 52 therein. So positioned, the coupler is locked as the integrated pin and clip 10 cannot be further inserted and the clip 20e prevents removal of the integrated pin and clip 10. To remove the integrated pin and clip 10, pressure is applied to the end of the clip 20e in the radial direction. The pressure allows the pivot pin 52 to advance from the notches 84 and thereby expand the tension arm 80. The clip 20e can then be move radially and then rotated to the unlocked or neutral position. Once in the unlocked position, the integrated pin and clip 10 can be removed from the receiver and the clip 20e will not freely rotate.

Figures 13, 14:
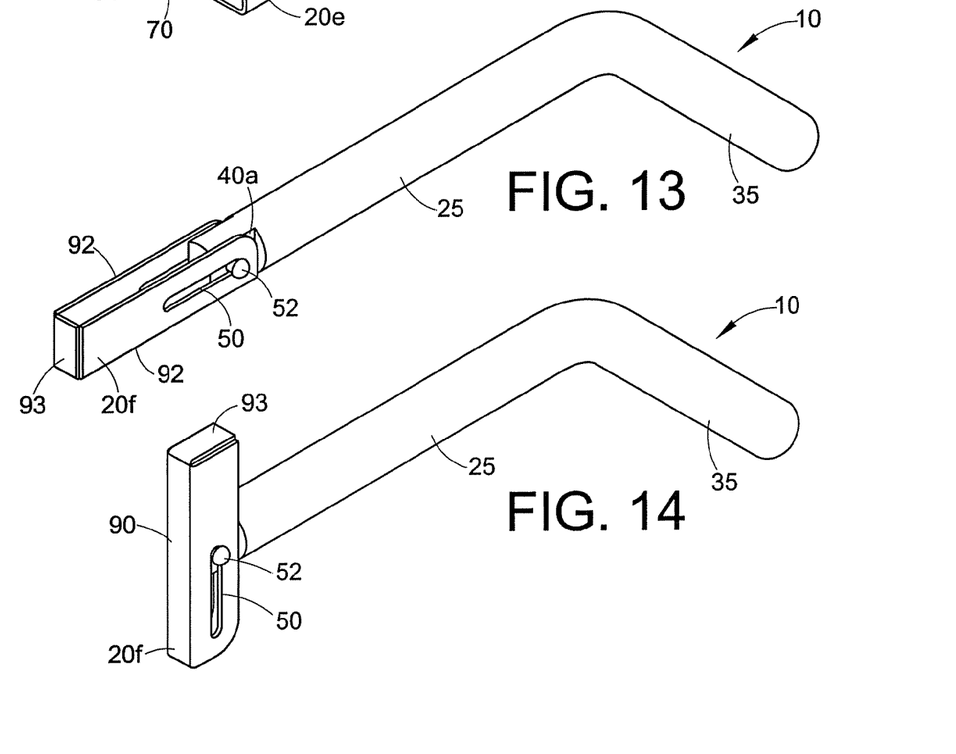
FIG. 13 is a perspective view of a sixth embodiment of an integrated pin and clip shown in the unlocked position.
FIG. 14 is a view of the integrated pin and clip of FIG. 13 shown in the locked position.

FIGS. 13-14 illustrate a fourth embodiment of the integrated pin and clip 10. The integrated pin and clip 10 is an angled piece of bar stock forming a shaft member 25 and a angled member 35, with a cutout portion 40a at the opposite end as the angled member. The cutout portion 40a generally includes a portion taken from the shaft member 25 on opposite sides. In this embodiment, the locking member is a slide clip 20f. The clip 20f is generally u-shaped with a base side 90 connecting the u-shaped arms 92. Optionally, the back 93 of the clip 20f can be closed as well. The clip 20f includes notches on each of the u-shaped arms that receive a pivot pin. The clip 20f includes a flattened end portion 94 that prevents rotation form the unlocked position. The integrated pin and clip 10 operates in a similar manner as the above embodiments, and any of the mentioned retention means can be added to assist in securing the clip 20f in the locked position.

FIGS. 5 and 6 illustrate an adapter sleeve 100 that can be used in conjunction with any of the embodiments mentioned herein. The adapter sleeve 100 generally slides over the shaft member 25 and provides for an increased diameter. Furthermore, nubs 105 can be added to the shaft 25 to prevent the adapter sleeve 100 from sliding axially along the shaft member.

Figure 16:
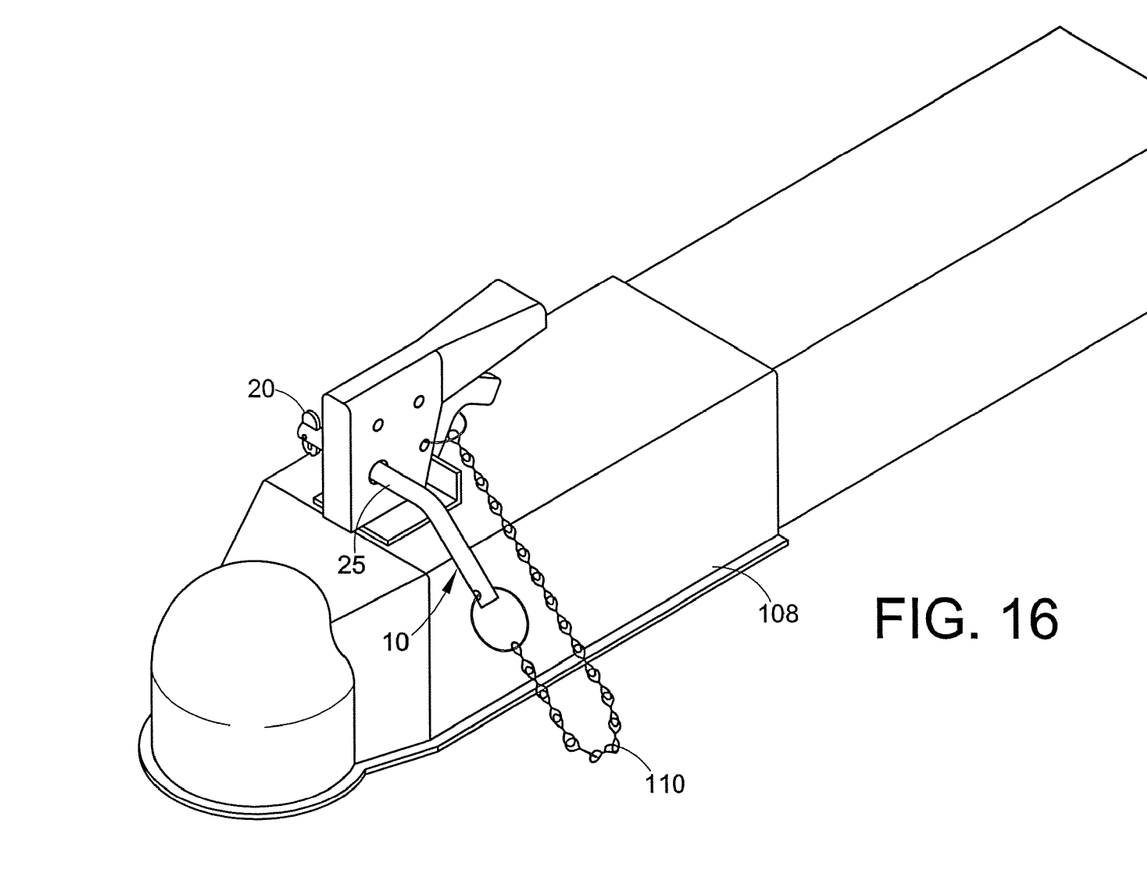
FIG. 16 illustrates a pin and clip assembly used in conjunction with a coupler.

FIG. 16 illustrates another embodiment of the present invention, specifically an integrated pin and clip 10 that is used in conjunction with a coupler 108. The integrated pin and clip 10 is inserted into the coupler latch 108 to prevent the uncoupling of the coupler 108 from the hitch ball (not shown). The integrated pin and clip 10 may include a chain 110 that allows the integrated pin and clip 10 from becoming detached from the coupler 108.

Each of the embodiments disclosed herein are disclosed as illustrative embodiments of the present invention. Modifications of these embodiments are contemplated and included in this application. For example, the rotation of the clip ninety degrees can be in any orientation relative to the bent portion of the coupler pin. In other embodiments the coupler pin need not be bent, but instead may include a stop section that is larger than the coupler holes, such as to prevent further insertion of the pin. In other embodiments, detents can be replaced with spring-loaded ball bearings or pins. In still other embodiments, the locking clip can take other shapes or configurations such that it maintains the advantages disclosed in this application. It should be noted the orientation of the locking member 20 rotation, the angle of the angled portion 35, and the nubs 105 are shown merely as one particular set of embodiments. As such, any of these orientations can be modified from that which is shown and still achieve the invention as set forth herein.

The invention claimed is:

1. An integrated pin and clip comprising:
   a shaft member;
   a locking member movable between a first position and a second position, wherein said first position allows for insertion and removal of the integrated pin and clip into a receiving hole and said second position does not allow for insertion and removal of the integrated pin and clip into a receiving hole; and
   retention means that secures said locking member in either one of said first position and said second position,
   wherein the shaft member includes at least one cut-out portion disposed along a slot in the shaft member on an outer surface and sized to receive the locking member in seating engagement, such that pivoting of the locking member out of the second position is prohibited while the locking member is in seating engagement with the at least one cut-out portion.

2. The integrated pin and clip of claim 1 further comprising an angled end portion located at a second end of said shaft member.

3. The integrated pin and clip of claim 1 further comprising a set of nubs located on said shaft member.

4. The integrated pin and clip of claim 1, wherein the shaft member includes first and second cut-out portions disposed approximately 90° apart from each other.

5. The integrated pin and clip of claim 1, wherein the locking member is adapted to be pulled out of engagement with the at least one cut-out to allow the locking member to be rotated from the second position to the first position.

6. The intergrated pin and clip of claim 1, wherein the locking member is adapted to be axially pulled away from the shaft and out of engagement with the at least one cut-out to allow the locking member to be rotated from the second position to the first position.

7. An integrated pin and clip comprising:
   a shaft member;
   a locking member located at a first end of said shaft member, wherein said locking member is movable between a first position that is generally coaxial to said shaft member and a second position in which the locking member extends laterally from only one side of said shaft member; and
   retention means that secures said locking member in either one of said first position and said second position;

wherein the shaft member includes at least one cut-out portion on an outer surface sized to receive the locking member in seating engagement, such that pivoting of the locking member out of the second position is prohibited while the locking member is in seating engagement with the at least one cut-out portion.

8. The integrated pin and clip of claim 7, wherein the locking member is adapted to be pulled out of engagement with the at least one cut-out to allow the locking member to be rotated from the second position to the first position.

9. The integrated pin and clip of claim 7, wherein the locking member is adapted to be axially pulled away from the shaft and out of engagement with the at least one cut-out to allow the locking member to be rotated from the second position to the first position.

10. An integrated pin and clip comprising:
a shaft member;
a locking member pivotable between a first position and a second position, wherein said first position allows for insertion and removal of the integrated pin and clip into a receiving hole and said second position does not allow for insertion and removal of the integrated pin and clip into a receiving hole; and
retention means that secures said locking member in an engaged condition when the locking member is in the second position, such that pivoting of the locking member out of the second position is prohibited while the locking member is in the engaged condition;
wherein the locking member is configured to be axially pulled away from the shaft and out of the engaged condition to allow the locking member to be pivoted from the second position to the first position.

11. The integrated pin and clip of claim 10, wherein when time locking member is in the engaged condition, a portion of the locking member is received in seating engagement with a cut-out portion of the shaft.

* * * * *